United States Patent [19]
Liu

[11] Patent Number: 6,125,415
[45] Date of Patent: Sep. 26, 2000

[54] TRANSMISSION SYSTEM HAVING ADJUSTABLE OUTPUT SIGNAL LEVELS UTILIZING TRANSISTORS SELECTABLE BETWEEN OPEN AND CLOSED STATES IN ACCORDANCE WITH CONTROL INPUT STATE

[75] Inventor: Edward Liu, Sunnyvale, Calif.

[73] Assignee: LSI Logic Corporation, Milpitas, Calif.

[21] Appl. No.: 09/095,180

[22] Filed: Jun. 10, 1998

[51] Int. Cl.[7] .............................. G06F 13/14; G06F 13/20
[52] U.S. Cl. ................................ 710/69; 710/14; 710/65; 345/95; 323/283
[58] Field of Search .................................. 710/1, 69, 65, 710/14; 345/95; 323/283

[56] References Cited

U.S. PATENT DOCUMENTS

| | | | |
|---|---|---|---|
| 5,241,281 | 8/1993 | Wilkes et al. | 340/799 |
| 5,717,321 | 2/1998 | Kerth et al. | 323/283 |
| 5,798,922 | 8/1998 | Wood et al. | 364/400.01 |
| 5,859,625 | 1/1999 | Hartung et al. | 345/95 |
| 5,952,992 | 9/1999 | Helms | 345/102 |

*Primary Examiner*—Thomas C. Lee
*Assistant Examiner*—Rehana Perveen

[57] ABSTRACT

A user control system for allowing an end user to control the level of a signal transmitted from a host to a transmission medium is disclosed. The user control system includes a digital current controller electrically connected to a bias voltage generator, and formed of a binary weighted transistor array that is switched according to user inputs received from a host. Also disclosed is a transmission system incorporating the user control system and further including a current-mode digital-analog converter, an on-chip low-pass filter, a line driver, and output impedance control. Further, a method for optimizing the output signal through user control is disclosed. The control system and method can be used in transmission of Ethernet signals onto an unshielded twisted pair cable. In addition, with appropriate modification, the transmission system and method can be used for transmitting ATM or other signals onto a transmission medium.

18 Claims, 4 Drawing Sheets

TRANSMISSION SYSTEM HAVING ADJUSTABLE OUTPUT SIGNAL LEVELS UTILIZING TRANSISTORS SELECTABLE BETWEEN OPEN AND CLOSED STATES IN ACCORDANCE WITH CONTROL INPUT STATE

CROSS-REFERENCE TO RELATED APPLICATIONS

This application is related to the following U.S. patent application having Ser. Nos. 09/095,183 (now pending) and 09/095,182 (now pending), filed on the same day as the instant application, and entitled "Current Mode Ethernet Transmitter" and "On-Chip Tuning Method and Apparatus." These applications are hereby incorporated by reference.

BACKGROUND OF THE INVENTION

1. Field of the Invention

The present invention relates generally to network transmission systems of computer systems and, more particularly, to methods and apparatuses for optimizing transmitter performance.

2. Description of the Related Art

Many computer systems today are utilized in a networked configuration where each networked computer can transmit data to other computers on the same network. Various systems and related protocols have been developed over the years to implement such networks, such as Token Ring, Ethernet, and ATM. Depending upon which network is being used, certain requirements must be met, such as the types of hardware used and particular data characteristics.

The Ethernet local area network (LAN) is one of the most popular and widely used computer networks in the world. Since the beginnings of the Ethernet in the early 1970's, computer networking companies and engineering professionals have continually worked to improve Ethernet product versatility, reliability and transmission speeds. To ensure that new Ethernet products were compatible and reliable, the Institute of Electrical and Electronic Engineers (IEEE) formed a working group to define and promote industry LAN standards. Today, the IEEE has various Ethernet working groups that are responsible for standardizing the development of new Ethernet protocols and products under an internationally well known LAN standard called the "IEEE 802.3 standard."

Currently, there are a wide variety of standard compliant Ethernet products used for receiving, processing and transmitting data over Ethernet networks. By way of example, these networking products are typically integrated into networked computers, network interface cards (NICs), routers, switching hubs, bridges and repeaters. Until recently, common data transmission speeds over Ethernet networks were 10 megabits per second (Mbps). However, to meet the demand for faster data transmission speeds, in May 1995 the IEEE 802.3standards committee officially introduced another standard, the "IEEE 802.3u standard," for a 100BASE-T system capable of performing data transmissions at up to about 100 Mbps. When operating with unshielded twisted pair (UTP) cable as a transmission medium, these networks are commonly referred to as 10BASE-T and 100BASE-T networks.

FIG. 1A is a diagrammatic representation of two computers 102 and 104, which are connected through a network 105. The network 105 can include, for example, other computers, network hubs, network routers, servers or the like. Of course, a single cable connecting the computers 102 and 104 can alternatively be used. Each computer 102 and 104 includes systems to facilitate exchange of information to and from the computer. These systems are diagramatically illustrated by an open systems interconnection (OSI) layered model 106 developed by the International Organization for Standards (ISO) for describing the exchange of information between layers. The OSI layered model 106 is particularly useful for separating the technological functions of each layer, and thereby facilitating the modification or update of a given layer without detrimentally impacting the functions of neighboring layers.

Multiple layers (not shown) defined in the OSI model 106 are responsible for various functions, such as providing reliable transmission of data over a network; routing data between nodes in a network; initiating, maintaining and terminating a communication link between users connected to the nodes; performing data transfers within a particular level of service quality; controlling when users are able to transmit and receive data depending on whether the user is capable of full-duplex or half-duplex transmission; translating, converting, compressing and decompressing data being transmitted across a medium; and providing users with suitable interfaces for accessing and connecting to a network. Further, the lower portion of the OSI model 106 includes a media access control layer (MAC) 107 which generally schedules and controls the access of data to a physical layer (PHY) 108.

At the lowermost portion of OSI model 106, PHY layer 108 is responsible for encoding and decoding data into signals that are transmitted across a particular medium, such as a cable 110. To enable transmission to a particular medium, the PHY layer 108 also includes a physical connector which is configured and operable to receive the cable 110. In addition, the cable 110 can take various forms, including that of an unshielded twisted pair (UTP) cable which is used for various types of Ethernet transmission, such as 10BASE-T and 100BASE-T.

When signals are passed through the cable 110 from the PHY layer 108, the potential exists for portions of the signal to emit from the cable 110 when it is an unshielded type of cable, such as a UTP. More specifically, the portions which may emit from the cable typically are high frequency components of the signal. Because such emissions may interfere with other electrical devices in the vicinity of the cable 110, the U.S. government has developed stringent emission standards (commonly known as FCC Class A Requirements) to avoid such interference. To comply with such standards, in the PHY layer the high frequency signal components are typically removed from the primary signal before transmission on the cable 110. As is known in the art, this is commonly referred to as transmit pulse shaping that is followed by reconstruction filtering.

Ethernet transmitters have typically utilized a configuration such as that shown in FIG. 1B to remove high frequency components from the signal before transmission through cable 110. FIG. 1B schematically depicts one application of an Ethernet device, specifically an Ethernet card 150. The Ethernet card 150 includes a PC board 152 on which a transmission system 153, formed by various components, is mounted. Included in these components can be a semiconductor chip 154, a filter 156, a transformer box 158, and a connector 160.

The semiconductor chip 154 is configured to convert the input binary data from the host (e.g., a computer into which the Ethernet card 150 is mounted) to a signal that can be transmitted to the cable 110. This typically is accomplished by a data converter such as a Manchester encoder 162 and a digital-to-analog converter (DAC) 164 formed on the silicon chip 154. These devices alternatively can be integrated on separate semiconductor chips that are each mounted onto the PC board 152.

The Manchester encoder 162 outputs a signal having voltage swings that correspond to the binary data. The DAC 164 then converts the digital signal voltage from the Manchester encoder 162 to an analog signal voltage utilizing a reference voltage, Vref 15. Unfortunately, due to power supply or manufacturing process variations, the reference voltage level that is internally generated can vary by as much as about 20%, which can lead to inaccurate and inconsistent signals. In an Ethernet system, this would result in not matching an "Ethernet eye" template, which is a desired Ethernet transmission characteristic.

In addition, the base voltage level is fixed in the hardware, and therefore cannot be changed to accommodate possible silicon variations in components of the transmission system, and different cable conditions. Due to both the voltage variability and lack of control, the transmission system may operate sub-optimally. For example, the transmitter eye diagram may not meet the transmission template required by the particular network system being used.

Electrically connected to the silicon chip 154, the filter 156 operates to remove the high frequency components from the signal passed from the silicon chip 154. Typically, the filter 156 is formed from discrete components located on the PC board 152, such as inductor components 166 and capacitor components 168 used to form an inductor-capacitor (LC) low pass filter as shown in FIG. 1B. Because discrete components are used, the filter 156 utilizes an area of the PC board 152 that is large relative to space utilized by the Manchester encoder 162 and DAC 164 on the silicon chip 154.

The filtered signal passes from the filter 156 through a transformer 170 in transformer box 158, and then to the connector 160 which is configured to receive the cable 110. Although some typical Ethernet systems are formed with a separate filter and a separate transformer, other systems include a single module (not shown) which physically incorporates both the filter 156 and transformer 170.

Unfortunately, typical systems do not adequately control the impedance of the signal transmitted to the cable 110 with on-chip resistors which are subject to fabrication variations. Without adequate impedance control, the output voltage levels, particularly the peak-to-peak voltage level (Vpp), may vary. For transmission over differential lines, such as a UTP cable, such variation may be undesirably, resulting in poor transmission characteristics.

In addition to the components depicted in FIG. 1B, the PC board 152 typically includes several other components. For example, the PC board 152 may further include a processor, terminal circuitry, wiring, routing, connectors to the host (e.g., a computer system), and other chips for performing the functions of other layers of the OSI model 106. Also, many of these components require their own routing and integration elements, which uses more space on the PC board 152. Further, as additional functions and components are developed, more space is needed on the PC board to accommodate those components.

In addition, the marketplace is driving the development of increasingly smaller computers, requiring corresponding decreases in various computer components. This includes a desire to decrease the size of Ethernet systems, such as Ethernet cards. However, any decrease in size of such systems is limited by the relatively large area necessary for the discrete components of the filter 156.

In view of the foregoing, it is desirable to have a method and apparatus that responds more robustly to power supply and manufacturing process variations that may cause the internally generated voltage to vary by up to about 20%. Also, a method and apparatus is desired for allowing user control of the transmission signal to accommodate hardware variations such as in the silicon of semiconductor chips or cable conditions.

SUMMARY OF THE INVENTION

Broadly speaking, the present invention fills these needs by providing an apparatus and method for user control of the transmission signal to optimize transmitter performance. It should be appreciated that the present invention can be implemented in numerous ways, including as a process, an apparatus, a system, a device or a method. Several inventive embodiments of the present invention are described below.

In one embodiment, a transmission system for transmitting data from a host to a transmission medium, the data being propagated over a network through the transmission medium, includes a user control system configured to modify characteristics of a transmission signal that represents the data that is transmitted from the host and is passed onto a transmission medium, such that the user control system is configured to digitally control the transmission signal according to inputs from a user.

In another embodiment, a method, for making a transmission system for passing data from a computer system through a transmission medium, includes forming a user control system for modifying characteristics of a signal representing that data to be transmitted from the computer system. The forming of the user control system includes providing a voltage generator that is configured to generate a bias voltage and forming a digital controller that is connected to the voltage generator and to the computer system. The forming of the digital controller includes arranging a first array of pass-gate transistors to receive the bias voltage, and arranging a second array of pass-gate transistors to be electrically connected to the first array of pass-gate transistors, each of the second array of pass-gate transistors being configured to be set in an open state or in a closed state. The method also includes connecting each of the second array of pass-gate transistors to the computer system such that each of the second array of pass-gate transistors is set in the open state or the closed state in accordance with a series of data bits that can be set through the computer system by a user.

In yet another embodiment, a transmission system, for communicating data between a computer system and another computer system through a transmission medium, includes a digital current controller means for facilitating user control of a primary signal that is representative of the data from the computer system and that is passed onto the transmission medium. The digital current controller includes a plurality of CMOS transistors that are digitally turned on or off in response to a series of data bits that are custom set by a user through the computer system. The digital current controller is configured such that when selected ones of the plurality of CMOS transistors are digitally turned on or off, a current magnitude that is passed to a digital to analog converter is changed in order to facilitate the user control of the primary signal that is representative of the data from the computer system and that is passed onto the transmission medium.

One advantage of the present invention is that less PC board space is used by the Ethernet transmitter. More specifically, because the filter is integrated on-chip, the space typically used by discrete components for the filter is not needed. Thus, the unused space can either be used by additional components on the PC board, or the size of the PC board itself can be reduced. Also, by avoiding the use of discrete components, the cost of the device is correspondingly decreased. In one embodiment of the present invention, the cost of a system is dramatically reduced by integrating the entire transmitter system on-chip, which should be contrasted with the cost of a transmitter system that requires PC board integrated discrete components. In some cases, the total cost of the transmitter system can increase by more than 20 times when discrete components are conventionally used to perform the filtering functions.

An additional advantage of the present invention is that the signal transmission is more robust in response to variations in power supply and manufacturing processes because it operates in current mode. In particular, this results in more consistent transmission signal levels being output to the Ethernet cable, for example. As a further advantage of the present invention, the output impedance is controlled, while the current signal is converted to a voltage signal having the proper signal levels, including the proper peak-to-peak voltage (Vpp).

The present invention further advantageously facilitates user control of the transmission signal levels, thereby allowing optimization of the transmission signal despite hardware fabrication variations. Thus, the user can digitally control the adjustment of the signal to conform with requirements and provide higher reliability. As a result, the user can cause the transmit eye diagram of the signal to better conform to the signal transmission template required by the particular network system to be used.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

An invention for user control of transmission signal levels is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1A:
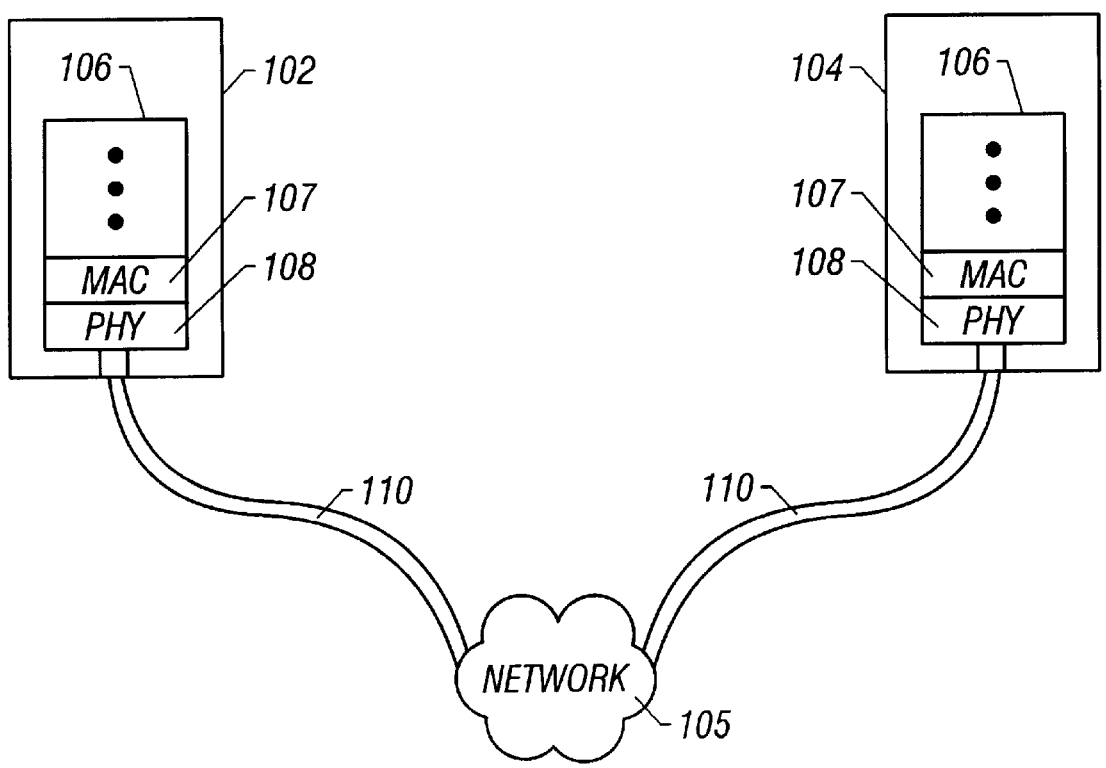
FIG. 1A depicts a schematic of two computers connected through a network according to the prior art.
Figure 1B:
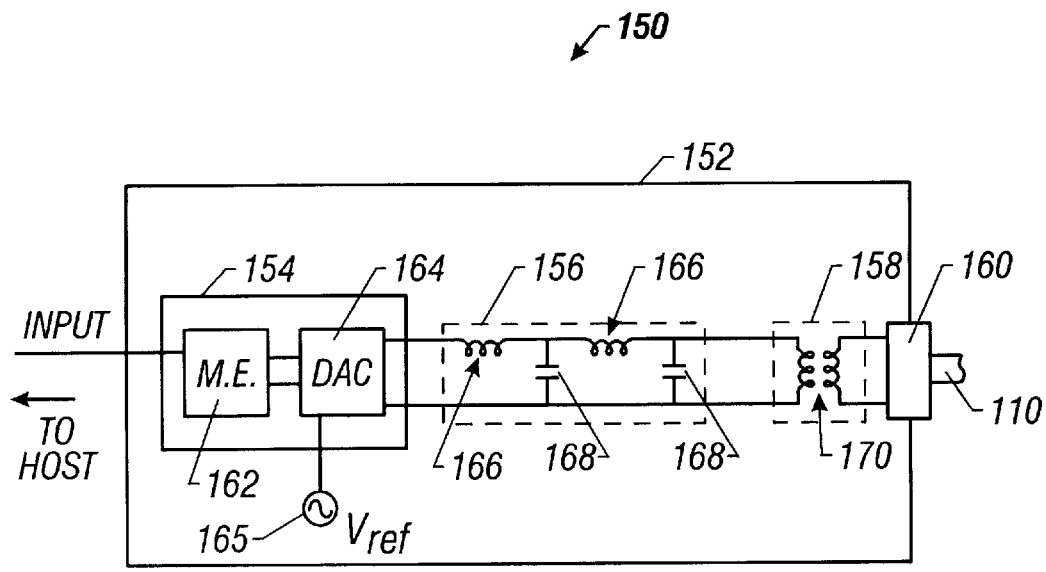
FIG. 1B depicts a schematic of a typical Ethernet transmission system.
Figure 2:
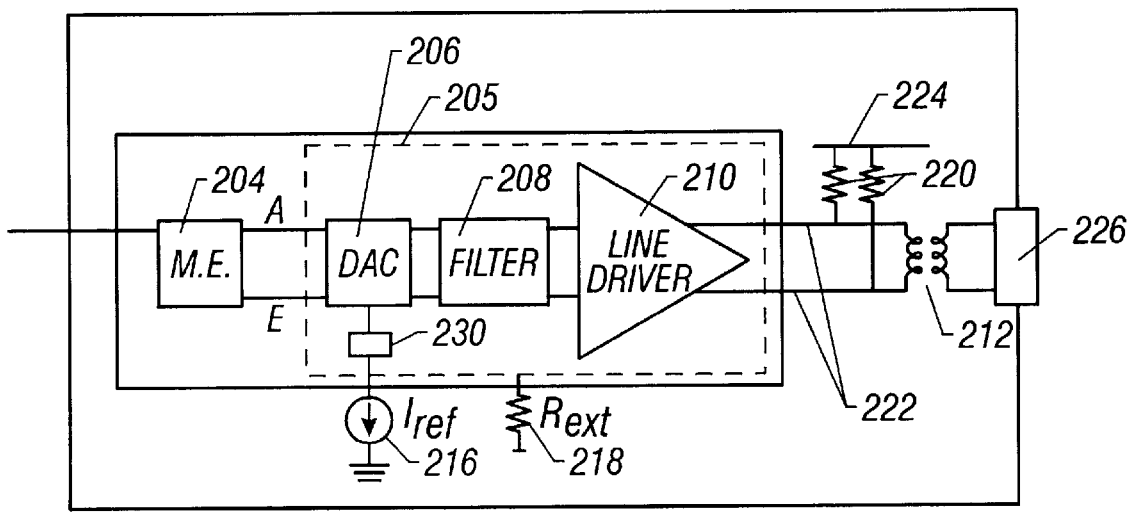
FIG. 2 depicts a schematic of an Ethernet transmission system according to one embodiment of the present invention.

FIG. 2 depicts an Ethernet card 200 incorporating an Ethernet transmission system 202. The Ethernet transmission system 202 includes a Manchester encoder 204 electrically connected to a mixed-signal block 205 and to a transformer 212. The mixed-signal block 205 includes a digital-to-analog converter 206, a user current controller 230, a filter 208, and a line driver 210. Also electrically connected to the mixed signal block 205 are a reference current (Iref) 216, and an external resistor (Rext) 218. In addition, pull-up resistors 220 are connected to lines 222 which connect the line driver 210 and the transformer 212. Resistors 220 are also connected to a rail voltage 224. In addition, to provide physical connection between Ethernet transmission system 202 and a cable (not shown), the Ethernet transmission system 202 includes a connector 226.

The Manchester encoder 204 is configured to receive binary data from a host, such as computer system 102, to which the Ethernet card 200 is coupled. The Manchester encoder 204 can receive binary data at various rates, such as 10 Mbps, which corresponds to a 10BASE-T Ethernet signal. The Manchester encoder 204 is further configured to encode the binary data into a digital signal voltage A (primary signal), which has a voltage that rises and falls in accordance with changes in the binary data.

Because there may be delays in the transmission of the signal at points where the signal is rising or falling, due to the particular electrical properties of the transmission cable which delay charging and discharging of the line, it is desired to increase the signal at these points of signal switching. To facilitate this increase, the Manchester encoder 204 is configured to generate a pre-emphasis signal E (secondary signal), which is set to be the inverse of the unit delay of A, for example, $$E(n)=A(n)-(1)'.$$

Using the pre-emphasis signal E and an exclusive NOR gate (not shown) as a signal switch detector, the Ethernet transmission system 202 detects when the signal generated by the Manchester encoder 204 switches between levels. When a switch is detected, the digital-to-analog converter 206 can act as a signal enhancer to obtain the necessary signal level.

The digital-to-analog converter (DAC) 206 is a two-bit current-switched device. Thus, the DAC produces a digital current signal according to a particular control current and the output of the signal switch detector. The control current is internally converted to a voltage to properly operate the DAC 206, such that it generates a current. In the present invention, instead of using a fixed current generated externally to the DAC 206, the control current can be modified by the user. It should be noted that because the DAC operates in current-mode, the transmission signal does not suffer from any changes due to power supply or manufacturing process variations, as would an internally generated voltage.

In one embodiment of the present invention, the DAC 206 is formed on a complementary metal-oxide semiconductor (CMOS) chip. Thus, the use of current-mode advantageously avoids the substantial cost and effort that would be necessary to provide a precision bandgap reference for this digital CMOS process. Also, because power supply and manufacturing process variations may cause variations in an internally generated voltages of about up to about 20%, and such variance generally is not experienced by internally generated currents, the transmission system of the present invention is made more robust by operating in current-mode.

To modify the control current, a digital current controller 230 is also electrically connected to the DAC 206. Depending upon user selected data bits that may be programmed (i.e., custom set) through a host, the digital current controller 230 causes the signal passed by the DAC 206 to have higher or lower current levels. Thus, the current level of the transmission signal can be precisely controlled by the user, forming a custom current level, to accommodate variations in the hardware and meet transmission template requirements of the desired transmission system.

Figure 3:
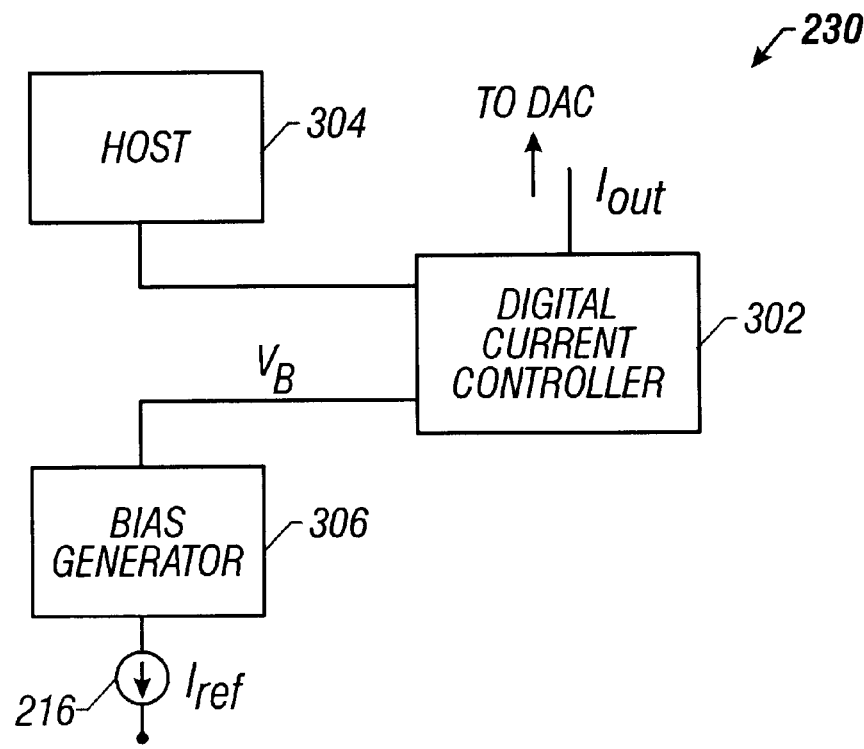
FIGS. 3 depicts a schematic of a user control system, according to one embodiment of the present invention.

FIG. 3 depicts the user current control system 230 in accordance with one embodiment of the present invention. The user current controller 230 includes a digital current controller 302, which is electrically connected to a host 304 and a bias generator 306. During operation of the user current controller 230, the host 304 provides an interface through which a user can set the digital current controller by setting a series of data bits which operate as control bits. At the same time, the bias generator (a current to voltage converter) 306 utilizes the reference current Iref 216 to generate a constant bias voltage $V_B$ input to the digital current controller 302. Based on the data bits and $V_B$, a particular level of current is passed to the DAC 206.

Figure 4:
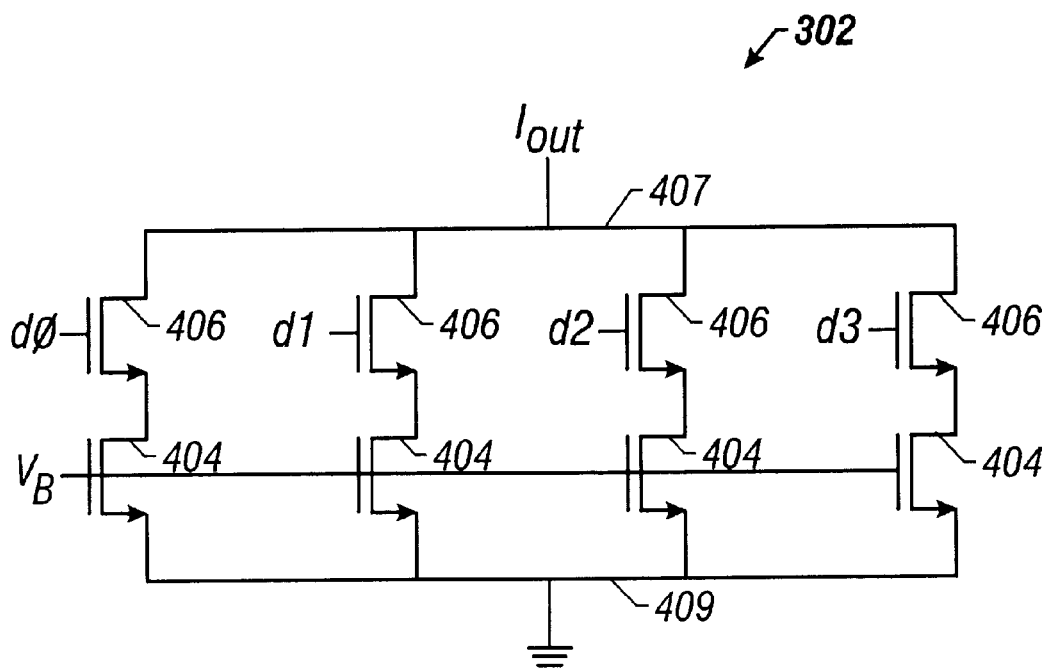
FIG. 4 depicts a schematic of components forming a digital current controller of the user control system depicted in FIG. 3, according to one embodiment of the present invention.

To better understand the present invention, FIG. 4 shows a schematic representation of the digital current controller 302. The digital current controller 302 includes a first array of transistor gates 404 connected to the bias voltage $V_B$, which opens a path for current to flow between a rail 407 and a rail 409. Also included is a second array of transistor gates 406, which are individually connected to the host, and are configured to individually receive the data bits d0, d1, d2 and d3. Thus, the user can set a particular combination of data bits d0 through d3, which will determine which of the gates 406 will be switched on and therefore allow current to flow. Thus, based on the input bit settings, a user can set the actual total amount of output current Iout that will be output to the DAC 206. Of course, the more transistor switches that are turned "on", the greater the current Iout.

While only four data bits are shown in FIG. 4, any number of control bits can be used to modify the signal currents generated for transmission. For example, in one embodiment of the present invention where an emphasis level is added to the signal to avoid transmission delays in the cable when the cable is charged and discharged, 16 control bits are used. These 16 control bits can be used to adjust various aspects of the signal to be transmitted, for example, four bits can be used to adjust the emphasis level while four other bits are used to adjust the non-emphasis level. In addition, four other bits can be used to adjust the common-mode level while the final four bits are used to adjust the positive and negative matching of the signal.

Because the user can modify the current levels and other signal characteristics during the installation or a particular use of the transmission system, appropriate signal levels can be produced depending on the particular combination of semiconductor fabrication variations or cable conditions. Thus, the above described digital controllability will provide users with much needed optimization flexibility in controlling the transmission signal eye pattern, even after the transmitter system design has been finalized, packaged and shipped for end use.

Again referring to FIG. 2, filter 208 is a low-pass filter that is configured to remove the high frequency components of an input signal while passing lower frequency components. In one embodiment of the present invention, filter 208 is formed on a CMOS chip and formed of a combination of semiconductor devices. By forming the filter 208 on-chip, the amount of space occupied by the filter is significantly decreased over a discrete filter. Accordingly, the cost of the transmission system can be reduced by about 95% by using the on-chip filter of the present invention.

The remaining signal is then passed to the line driver 210 which amplifies the signal to levels appropriate for the cable 110 that is used, and which launches the signal onto the cable. Before reaching the cable, however, the signal is passed through pull-up resistors 220 which are coupled to the rail voltage 224. The pull-up resistors 220 are therefore well suited to convert the signal from a current to a voltage, and to modify that voltage to levels appropriate for the transmission cable and transmission protocol being used. After passing through the transformer 212, the signal is then launched to the cable 110 through connector 226. It should be noted that, because the filtering is performed on-chip, a relatively inexpensive transformer-only module (not including an external filter) can be used.

Figure 5:
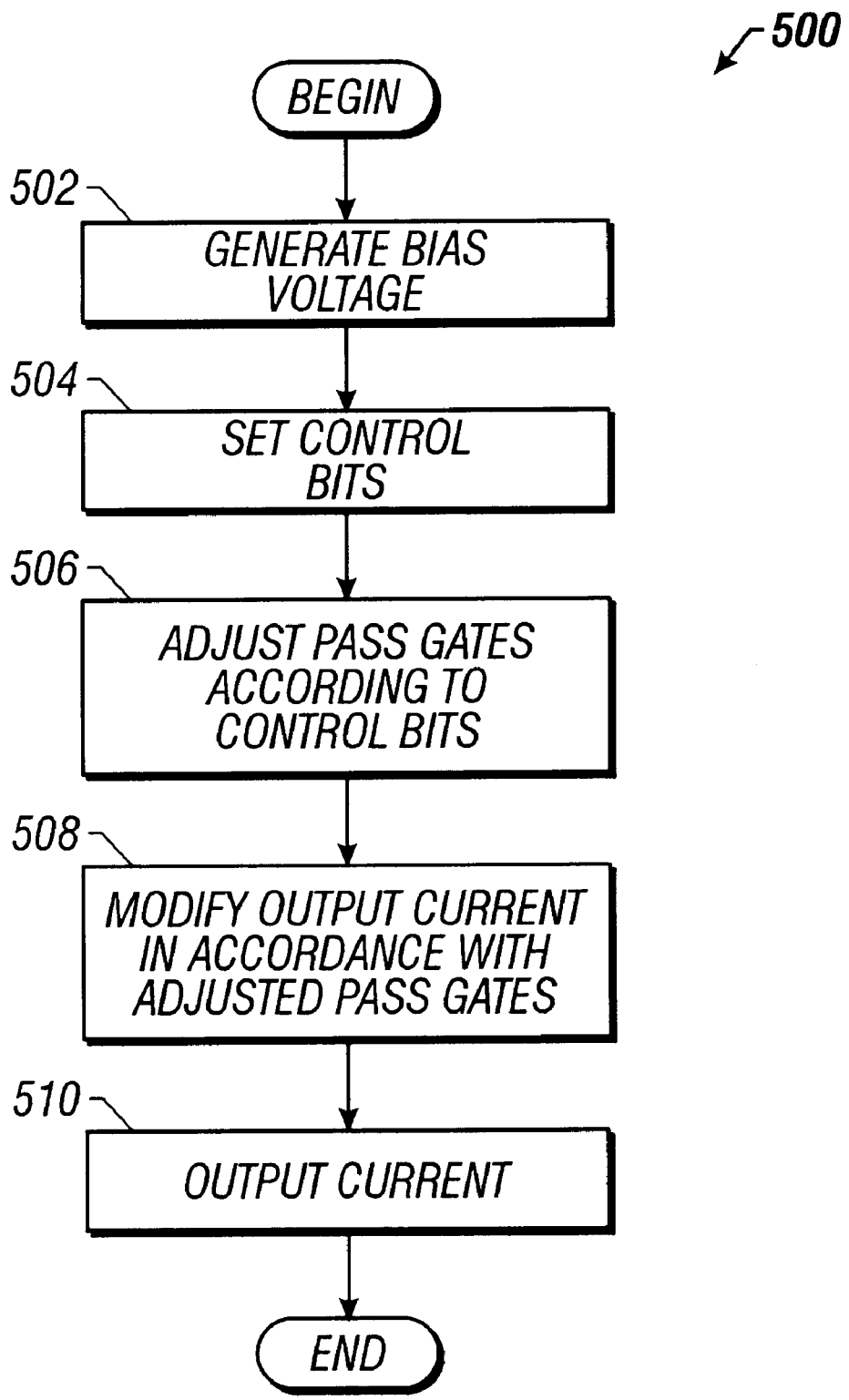
FIG. 5 is a flow chart of a method for user control of transmission signal levels, according to one embodiment of the present invention.

FIG. 5 is a flowchart representing a method 500 for user controlled current generation in accordance with one embodiment of the present invention. In operation 502, a bias voltage is generated. In addition to generating a bias voltage, control bits are set by the user in operation 504. The control bits are set in accordance with the level of current desired by the user to be transmitted to the cable 110. After the control bits are set in operation 504, pass gates are adjusted according to the settings of the control bits in operation 506. Following the pass gate adjustment, the output current is set to flow in accordance with the adjusted pass gates in operation 508. Finally, in operation 510 the current is output to the DAC 206.

In another embodiment of the present invention, a voltage output DAC can be used to modify the signal to be transmitted over the transmission medium. In such a system, the DAC does not convert the voltage to a current, and a user modifiable voltage controller is used. The user modifiable voltage controller includes a digital voltage controller that is used to generate an output voltage having a level controlled by control bits set by the user. Here, the transmission system would also benefit from the ability to control the signal values, thus allowing optimization of the eye pattern by the end user after the design is completed.

The Manchester encoder 204, DAC 206, filter 208, and line driver 210 may each be formed on separate CMOS chips. Alternatively, however, other combinations of these devices can be integrated on a single chip or a single module that can be individually connected or removed from the PC board. For example, the DAC 206, filter 208, and line driver 210 can be formed in a single module, while the Manchester encoder is formed in a separate module.

Although one embodiment of the present invention is configured to transmit 10BASE-T Ethernet signals, the transmission system of the present invention can be used to transmit other types of Ethernet signals, with appropriate modification of the above described components. Also, the present invention can be configured to transmit other types of signals, such as ATM signals, by making appropriate modifications to the components of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A transmission system for transmitting data from a host to a transmission medium, the transmission system comprising:

line driver circuitry for providing data signals to the transmission medium;

a bias generator for producing a bias signal; and a digital controller for selectively modifying the data signals, comprising, a first plurality of transistors, each transistor supporting a current that is dependent on the bias signal; and a second plurality of transistors coupled in series with the first plurality of transistors, the transistors of the second plurality of transistors selectable between an open state or a closed state in accordance with control data bits set by the host, such that the control data bits are capable of modifying characteristics of the data signals.

2. A transmission system as recited in 1, wherein the bias generator is electrically connected to a reference current source, such that the bias signal is related to the magnitude of the reference current.

3. The transmission system as recited in claim 1, wherein when one of the second plurality of transistors is set in the closed state, current flows through that one of the second plurality of transistors, the current modifying a data signal.

4. The transmission system as recited in claim 1, further comprising:

a digital-to-analog converter (DAC) configured to receive a primary signal for conversion to an output signal provided to the line driver circuitry, the DAC electrically connected with the digital controller such that the DAC generates an output signal level according, at least in part, to the control data bits.

5. The transmission system as recited in claim 4, further comprising:

an integrated filter removing high frequency components from the data signals.

6. The transmission system as recited in claim 1, further comprising:

an encoder for encoding data from the host into a primary signal having a digital voltage according to the data, the encoder generating a secondary signal that is an inverse of a unit delay of the primary signal; and a circuit for detecting a switch in the voltage of the primary signal, configured to detect the switch based on the primary signal and secondary signal, such that the status of the control data bits is determined, at least in part, on when the circuit detects the switch.

7. A transmission system for transmitting data from a host system to a transmission medium, comprising:

a first plurality of transistors, each transistor supporting an intermediate current;

a second plurality of transistors coupled to the first plurality of transistors, the transistors of the second plurality of transistors selectable between an open state or a closed state in accordance with the state of at least one control input, an intermediate current contributing to a control current when the associated transistor is in a closed state; and conversion circuitry generating a data signal for provision to the transmission medium, the magnitude of the data signal being related to the control current.

8. The transmission system of claim 7, further comprising:

bias circuitry providing a bias voltage, each transistor of the first plurality of transistors having a gate node coupled to the bias voltage.

9. The transmission system of claim 7, wherein the state of the at least one control input is variable by the host system to adjust the magnitude of the data signal to cancel the effects of transmission delays in the transmission medium.

10. The transmission system of claim 7, further comprising a filter coupled between the conversion circuitry and the transmission medium for removing predetermined frequency components of the data signal.

11. The transmission system of claim 10, further comprising line driver circuitry coupled between the filter and transmission medium for driving the data signal onto the transmission medium.

12. The transmission system of claim 11, manufactured as an integrated circuit.

13. The transmission system of claim 7, substantially compliant with an Ethernet standard.

14. A method for transmitting data from a host system to a transmission medium, comprising the steps of:

providing a first plurality of transistors, each transistor supporting an intermediate current;

providing a second plurality of transistors coupled to the first plurality of transistors, the transistors of the second plurality of transistors selectable between an open state or a closed state in accordance with the state of at least one control input, an intermediate current contributing to at least one control current when the associated transistor is in a closed state;

providing conversion for generating a data signal for provision to the transmission medium, the magnitude of the data signal being related to the at least one control current; and varying the at least one control input to adjust the magnitude of the data signal.

15. The method of claim 14, the magnitude of the data signal being adjusted to negate the effects of transmission delays in the transmission medium.

16. The method of claim 15, the data signal substantially compliant with an Ethernet standard.

17. The method of claim 14, further comprising:

filtering the data signal with a filter to remove predetermined high frequency components prior to providing the data signal to the transmission medium.

18. The method of claim 17, wherein the first plurality of transistors, second plurality of transistors, conversion circuit and filter are manufactured as an integrated circuit.

* * * * *